(12) United States Patent
Chahine et al.

(10) Patent No.: US 10,848,725 B2
(45) Date of Patent: Nov. 24, 2020

(54) COLOR DISPLAY MODES FOR A THERMAL IMAGING SYSTEM

(71) Applicant: Seek Thermal, Inc., Santa Barbara, CA (US)

(72) Inventors: Romeo Chahine, Santa Barbara, CA (US); Jason Wolfe, Santa Barbara, CA (US); Ross Williams, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 0 days.

(21) Appl. No.: 16/051,077

(22) Filed: Jul. 31, 2018

(65) Prior Publication Data

US 2020/0029059 A1   Jan. 23, 2020

Related U.S. Application Data

(60) Provisional application No. 62/598,931, filed on Dec. 14, 2017, provisional application No. 62/541,550, filed on Aug. 4, 2017.

(51) Int. Cl.
*H04N 9/64* (2006.01)
*H04N 9/77* (2006.01)
(Continued)

(52) U.S. Cl.
CPC .............. *H04N 9/646* (2013.01); *G06T 5/40* (2013.01); *H04N 5/33* (2013.01); *H04N 9/77* (2013.01); *G06T 2207/10048* (2013.01)

(58) Field of Classification Search
CPC ... G06T 5/40; G06T 2207/10048; H04N 5/33; H04N 9/646; H04N 9/77
See application file for complete search history.

(56) References Cited

U.S. PATENT DOCUMENTS

| 4,967,082 A | 10/1990 | Cooke et al. |
| 6,031,543 A | 2/2000 | Miyashita et al. |

(Continued)

FOREIGN PATENT DOCUMENTS

WO   WO 2000/037970   6/2000

OTHER PUBLICATIONS

PCT International Search Report and Written Opinion for PCT/US2018/38606 dated Oct. 30, 2018 in 19 pages.

*Primary Examiner* — Mark R Gaworecki
(74) *Attorney, Agent, or Firm* — Knobbe Martens Olson & Bear LLP

(57) ABSTRACT

Systems and methods for allocating display colors to thermal image intensity data acquired by thermal band photodetectors. Intensity data from the photodetectors corresponding to scene temperature is converted to a digital value within an analog to digital conversion (ADC) range. The full ADC range may be divided into two or more sub-ranges. In one sub-range, intensity values within that sub-range are assigned display colors from a first color table utilizing one or more Histogram Equalization (HE) techniques. In another sub-range, specific display values from a color table different from the first may be are assigned to specific intensity values. Lower temperatures may be assigned colors using HE and higher temperatures are assigned specific colors corresponding to specific temperatures. Such an arrangement is particularly applicable to thermal imaging use by firefighters because the arrangement allows them to determine temperature directly from displayed color for potentially dangerous temperatures.

20 Claims, 10 Drawing Sheets

(51) Int. Cl.
*H04N 5/33* (2006.01)
*G06T 5/40* (2006.01)

(56) References Cited

U.S. PATENT DOCUMENTS

| | | | |
|---|---|---|---|
| 6,255,650 B1 * | 7/2001 | Warner | G02B 23/125 |
| | | | 250/330 |
| 6,577,762 B1 | 6/2003 | Seeger et al. | |
| 6,766,056 B1 | 7/2004 | Huang et al. | |
| 7,544,944 B2 | 6/2009 | Strandemar | |
| 7,683,321 B1 | 3/2010 | King et al. | |
| 7,693,679 B1 | 4/2010 | Warnke et al. | |
| 8,340,414 B2 | 12/2012 | Högasten et al. | |
| 8,354,639 B2 | 1/2013 | Jönsson et al. | |
| 8,384,722 B1 | 2/2013 | Tremblay et al. | |
| 8,386,951 B2 | 2/2013 | Tallman | |
| 8,599,262 B2 | 12/2013 | George-Svahn et al. | |
| 9,279,728 B2 | 3/2016 | Roth et al. | |
| 9,367,219 B2 | 6/2016 | Andersson | |
| 2001/0014175 A1 | 8/2001 | Tavor | |
| 2002/0074499 A1 | 6/2002 | Butler | |
| 2009/0212225 A1 | 8/2009 | Zheng et al. | |
| 2010/0220193 A1 | 9/2010 | Högasten et al. | |
| 2012/0176547 A1 | 7/2012 | Guermoud et al. | |
| 2012/0249800 A1 | 10/2012 | George-Svahn et al. | |
| 2012/0312976 A1 | 12/2012 | Boulanger et al. | |
| 2015/0009325 A1 | 1/2015 | Kardashov | |
| 2015/0124102 A1 | 5/2015 | Frost et al. | |
| 2015/0281601 A1 | 10/2015 | Ganapathi | |
| 2016/0080664 A1 | 3/2016 | Blake | |
| 2018/0283953 A1 | 10/2018 | Frank et al. | |

* cited by examiner

COLOR DISPLAY MODES FOR A THERMAL IMAGING SYSTEM

CROSS-REFERENCE TO RELATED APPLICATIONS

This application claims the benefit of U.S. Provisional Application No. 62/541,550, filed Aug. 4, 2017, entitled "COLOR DISPLAY MODES FOR A THERMAL IMAGING SYSTEM," and U.S. Provisional Application No. 62/598,931, filed Dec. 14, 2017, entitled "COLOR DISPLAY MODES FOR A THERMAL IMAGING SYSTEM," both of which are hereby incorporated by reference in their entirety.

FIELD

The present disclosure generally relates to thermal imaging, and in particular to the allocation of display colors to image data.

BACKGROUND

The increasing availability of high-performance, low-cost uncooled thermal imaging devices, such as those based on bolometer focal plane arrays (FPAs), is enabling the design and production of consumer-oriented thermal imaging cameras and sensors capable of quality thermal imaging. Such thermal imaging systems have long been expensive and difficult to produce, thus limiting the employment of high-performance, long-wave imaging to high-value instruments, such as aerospace, military, or large-scale commercial applications. Thermal imaging systems of a given design produced in quantity may have different design requirements than complex military or industrial systems. For some thermal imaging applications it may be desirable for display colorization to provide direct correlation to thermal image data.

SUMMARY

Example embodiments described herein have innovative features, no single one of which is indispensable or solely responsible for their desirable attributes. Without limiting the scope of the claims, some of the advantageous features will now be summarized.

One embodiment includes a method for displaying data from a thermal imaging system, the thermal imaging system including an array of photodetectors, each detector configured to output a signal corresponding to an acquired thermal intensity of a portion of an imaged scene, the signal comprising a binary word whose value is an analog-to-digital conversion (ADC) of the intensity, and wherein the binary word is within a conversion range of the system. The method comprises dividing the conversion range into at least two regions comprising sub-ranges of continuous or non-continuous intensity values, wherein the intensity values comprise at least one of raw intensity values and filtered intensity values; allocating the intensity values of at least a first sub-range to a first display color table, wherein the colors assigned to the intensity values for display are determined with a histogram equalization (HE) process; and allocating the intensity values of at least a second sub-range to a second display color table different from the first display color table, wherein a specific color is assigned to each intensity value for display.

In some embodiments, an available number of binary word values corresponding to the ADC range is larger than a number of discrete color values corresponding to the color tables. In some embodiments, the first sub-range corresponds to a range of intensity values lower than the intensity values of the second sub-range. In some embodiments, intensity values from minimum to maximum in the second sub-range are assigned specific sequential values from the second color display table. In some embodiments, the assignment of specific sequential values is performed linearly between color table values and intensity values, wherein specific colors represent fixed intensity levels. In some embodiments, the imaging system includes a thermography function that converts intensity values to scene temperature. In some embodiments, the sub-ranges are identified as covering temperature ranges. In some embodiments, each color specifically allocated to sub-range intensity values corresponds to a specific temperature. In some embodiments, the first sub-range is selected to be below at least one temperature of interest, and the second sub-range is selected to be above at least one temperature of interest. In some embodiments, the second sub-range is chosen to be at least 150 degrees C., and the top of the second sub-range is at least 650 degrees C.

A second embodiment includes a thermal imaging system, the thermal imaging system comprising an array of photodetectors, each photodetector configured to output a signal corresponding to an acquired thermal intensity of a portion of an imaged scene, the signal comprising a binary word whose value is an analog-to-digital conversion (ADC) of the intensity and wherein the binary word is within a conversion range of the system, the thermal imaging system further comprising at least one processor for acquiring and processing image data from the photodetector array, and a display for image data. The thermal imaging system is configured to divide the conversion range into at least two regions comprising sub-ranges of continuous or non-continuous intensity values, wherein the intensity values comprise at least one of raw intensity values and filtered intensity values; allocate the intensity values of at least a first sub-range to a first display color table, wherein the colors assigned to the intensity values for display are determined with a histogram equalization (HE) process; and allocate the intensity values of at least a second sub-range to a second display color table different from the first color display table, wherein a specific color is assigned to each intensity value for display.

In some embodiments, an available number of binary word values corresponding to the ADC range is larger than a number of discrete color values corresponding to the color tables. In some embodiments, the first sub-range corresponds to a range of intensity values lower than the intensity values of the second sub-range. In some embodiments, intensity values from minimum to maximum in the second sub-range are assigned specific sequential values from the second color display table. In some embodiments, the assignment of specific sequential values is performed linearly between color table values and intensity values, wherein specific colors represent fixed intensity levels. In some embodiments, the imaging system includes a thermography function that converts intensity values to scene temperature. In some embodiments, the sub-ranges are identified as covering temperature ranges. In some embodiments, each color specifically allocated to sub-range intensity values corresponds to a specific temperature. In some embodiments, the first sub-range is selected to be below at least one temperature of interest, and the second sub-range is selected to be above at least one temperature of interest. In some embodiments, the second sub-range is chosen to be at least 150 degrees C., and the top of the second sub-range is at least 650 degrees C.

A third embodiment includes a method for displaying data from a thermal imaging system, the system including an array of photodetectors, each detector configured to output a signal corresponding to an acquired thermal intensity of a portion of an imaged scene, the signal comprising a binary word whose value is an analog-to-digital conversion (ADC) of the intensity, and wherein the binary word is within a conversion range of the system. The method comprises dividing the conversion range into at least two regions comprising sub-ranges of continuous or non-continuous intensity values, wherein the intensity values comprise at least one of raw intensity values and filtered intensity values; allocating the intensity values of at least a first sub-range to a first display color table, wherein the colors assigned to the intensity values for display are determined with a histogram equalization (HE) process; allocating the intensity values of at least a second sub-range to a second display color table different from the first display color table, wherein a predetermined number of pixels within the second sub-range comprise a first set of pixels colorized with the second color table, and wherein at least a differently colored second set of pixels are colorized with the first color table; and displaying the first set of pixels and the differently colored second set of pixels in one image.

In some embodiments, an available number of binary word values corresponding to the ADC range is larger than a number of discrete color values corresponding to the color tables (number of discrete colors). In some embodiments, the first sub-range corresponds to a range of intensity values at least one of lower than, higher than, and including, the intensity values of the second sub-range. In some embodiments, the first sub-range covers substantially the full conversion range. In some embodiments, the second sub-range covers a range including less than the full conversion range. In some embodiments, the second sub-range is defined by upper and lower limits forming a target range, the upper and lower limits being at least one of user-selectable and predetermined. In some embodiments, the second sub-range is only colorized with the second color table if at least a predetermined threshold number of pixels are within the target range. In some embodiments, only a predetermined percentage of the pixels within the target range are colorized with the second color table. In some embodiments, the target range pixels are colorized using all or part of the second color table. In some embodiments, the second color table is assigned to the selected target pixels by HE. In some embodiments, the imaging system includes a thermography function that converts intensity values to scene temperature. In some embodiments, a target range is identified as covering a temperature range.

A fourth embodiment includes a thermal imaging system, the thermal imaging system comprising an array of photodetectors, each photodetector configured to output a signal corresponding to an acquired thermal intensity of a portion of an imaged scene, the signal comprising a binary word whose value is an analog-to-digital conversion (ADC) of the intensity and wherein the binary word is within a conversion range of the system, the thermal imaging system further comprising at least one processor for acquiring and processing image data from the photodetector array, and a display for image data. The thermal imaging system is configured to divide the conversion range into at least two regions comprising sub-ranges of continuous or non-continuous intensity values, wherein the intensity values comprise at least one of raw intensity values and filtered intensity values; allocate the intensity values of at least a first sub-range to a first display color table, wherein the colors assigned to the intensity values for display are determined with a histogram equalization (HE) process; allocate the intensity values of at least a second sub-range to a second display color table different from the first display color table, wherein a predetermined number of pixels within the second sub-range comprise a first set of pixels colorized with the second color table, and wherein at least a differently colored second set of pixels are colorized with the first color table; and display the first set of pixels and the differently colored second set of pixels in one image.

In some embodiments, the first sub-range corresponds to a range of intensity values at least one of lower than, higher than, and including, the intensity values of the second sub-range. In some embodiments, the first sub-range covers substantially the full conversion range. In some embodiments, the second sub-range covers a range including less than the full conversion range. In some embodiments, the second sub-range is defined by upper and lower limits forming a target range, the upper and lower limits being at least one of user selectable and predetermined. In some embodiments, the second sub-range is only colorized with the second color table if at least a predetermined threshold number of pixels are within the target range. In some embodiments, only a predetermined percentage of the pixels within the target range are colorized with the second color table. In some embodiments, the target range pixels are colorized using all or part of the second color table. In some embodiments, the second color table is assigned to the selected target pixels by HE. In some embodiments, the imaging system includes a thermography function that converts intensity values to scene temperature. In some embodiments, a target range is identified as covering a temperature range.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
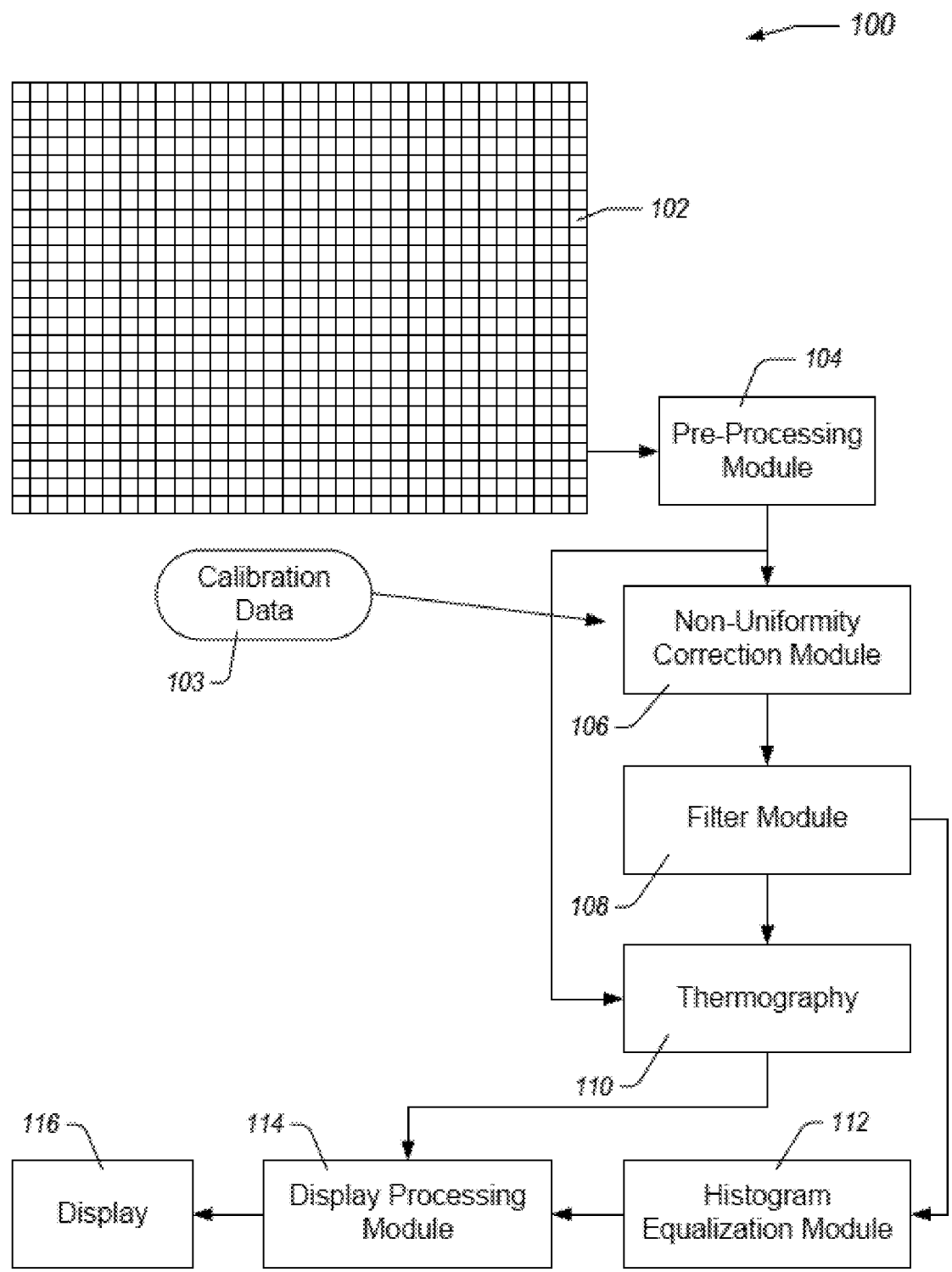
FIG. 1A illustrates a functional block diagram of an example imaging system.

Generally described, embodiments of the present disclosure relate to allocating display colors to thermal image intensity data. Some embodiments provide desirable utility for thermal imaging systems in applications where rapid identification of surrounding temperature is important. Some embodiments of the present disclosure include systems and methods for improved color display for certain thermal imaging applications.

Examples and implementations described herein focus, for the purpose of illustration, on an imaging system including an infrared camera or sensor using a focal plane array. Various aspects of the disclosure will now be described with regard to certain examples and embodiments, which are intended to illustrate but not limit the disclosure. For many of these aspects, the example embodiments will describe an imaging system where the thermal sensor delivers image data to one or more processors which execute a series of image processing steps, which in some embodiments may include the elements for thermography.

Some embodiments described herein provide for splitting the dynamic range of a thermal imaging system into sub-ranges and allocating display colors differently for the various sub-ranges. Advantageously, this may allow the colorization to be tailored to the needs of the intended use of the thermal imager.

Some embodiments described herein provide for using Histogram Equalization (HE) for allocating colors in some sub-ranges while assigning fixed specific colors to other sub-ranges. Advantageously, this may allow for direct color identification of intensity and/or temperature for temperature ranges of interest.

Some embodiments described herein provide for applying the HE allocation to lower intensities (temperatures) and specific colors to higher intensity (temperature) sub-ranges. Advantageously, this may allow for direct color identification of hotter areas of a scene.

Some embodiments described herein provide for setting the high temperature specific color sub-range to correspond to temperatures of importance for firefighters. Advantageously, this may allow firefighters to discriminate dangerous high temperature areas directly from the displayed colors.

The disclosed color display processes and systems may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed concepts may be implemented in conjunction with one or more focal plane arrays (FPA) on a camera core, wherein the processor and memory components executing the disclosed methods may be on a processing device mated to the camera core, such as a mobile appliance including smart phones, tablets, personal computers, etc. In some implementations, the processing and memory elements of the imaging system may be in programmable logic or on-board processors that are part of the core or camera system. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a thermal imaging focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, S, signal, in the image. These digital words are usually of a length determined by the analog to digital conversion (A/D) process. For example, if the pixel data is converted with a 14 bit A/D, the pixel words may be 14 bits in length, and there may be 16384 counts per word, i.e. the dynamic range of the example device is 0 to 16383. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For example, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. Pat. No. 9,584,750, issued Feb. 28, 2017, U.S. patent application Ser. No. 14/292,124, filed May 30, 2014, U.S. Pat. No. 9,595,934, issued Mar. 14, 2017, U.S. Pat. No. 9,727,954, issued Aug. 8, 2017, U.S. Pat. No. 9,930,324, issued Mar. 27, 2018, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit, which, as described, may either be part of a camera device, a processing device interfaced to the camera device, and/or distributed between the two. The processing unit may include, for some imaging systems, control functions for operating a shutter. A visible sensor, usually including a visible light sensitive FPA may also be used. Such visible imaging systems are common in digital cameras, Personal Electronic Devices (PED's), and the like. The resources used for image processing and display functions of the two sensors may be shared or separate as convenient for a particular system design. Systems including multiple imaging sensors of various or the same types may also benefit from the disclosed systems and methods.

Example Imaging Systems

FIG. 1A illustrates a functional block diagram of an example thermal imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For example, some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit (ROIC). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Pat. No. 9,595,934, entitled "Gain Calibration for an Imaging System," issued Mar. 14, 2017, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter (RDAC) functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. Pat. No. 9,584,750, issued Feb. 28, 2017, entitled "Adaptive Adjustment of the Operating Bias of an Imaging System," the entire contents of which is incorporated by reference herein.

Bad pixel replacement may be present as well, examples of which are described in U.S. patent application Ser. No. 14/436,626, entitled "Pixel Decimation for an Imaging System," and filed Feb. 17, 2017, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. Additional examples of systems and methods for non-uniformity correction are described in U.S. Pat. No. 9,930,324, entitled "Time Based Offset Correction for Imaging Systems," issued Mar. 27, 2018, the entire contents of which is incorporated by reference herein. Adaptive calibration or shutter control may include elements present in the pre-processing module 104 or equivalent, as well as parts of the image processing chain as described in U.S. Pat. No. 9,924,116, entitled "TIME BASED OFFSET CORRECTION FOR IMAGING SYSTEMS AND ADAPTIVE CALIBRATION," issued Mar. 20, 2018, the entire contents of which is incorporated by reference herein. Fixed Pattern Noise (FPN) mitigation if desired may take place as part of the NUC module in order to place this functionality early in the image processing chain. FPN mitigation should preferably take place after offset correction so could not reasonably happen before NUC. Or, in some cases, a Fixed Pattern Noise mitigation element could operate in parallel with or even instead of a NUC based on a shutter or other physical calibration element. Such approaches may be referred to as Scene Based NUC (SBNUC). Additional examples of systems and methods for FPN mitigation and/or SBNUC are described in U.S. patent application Ser. No. 15/629,526, entitled "Fixed Pattern Noise Mitigation for a Thermal Imaging Systems" filed Jun. 21, 2017, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. Pat. No. 9,549,130, entitled "Compact Row Column Noise Filter for an Imaging System," issued Jan. 17, 2017, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Pat. No. 9,947,086, entitled "Image Adjustment Based on Locally Flat Scenes," issued Apr. 17, 2018, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a band-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. Pat. No. 9,727,954, entitled "Local Contrast Adjustment for Digital Images," issued Aug. 8, 2017, the entire contents of which is incorporated by reference herein. High-pass filter and related techniques may be used to detect edge features in an image as well.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to implied temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015 and U.S. patent application Ser. No. 15/843,667 entitled "THERMOGRAPHY PROCESS FOR A THERMAL IMAGING SYSTEM" filed Dec. 15, 2017, the entire contents of which are incorporated by reference herein. The current disclosure relates to a system where thermography may be available.

The image processing system 100 includes a histogram equalization module 112, or other display conversion module (compression modules for example, or combinations of different techniques), configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words, which is related to analog to digital (A/D) conversion resolution. For example, the A/D sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein. The Display Processing Module 114 may also contain or interface to a display driver which converts color table values to actual luminance color values to drive the display 116, such as RGB, yCV etc.

The display 116 can be configured to display the processed image data. The display 116 can also be configured to accept input to interact with the image data and/or to control the imaging system 100. For example, the display 116 can be a touchscreen display.

Figure 1B:
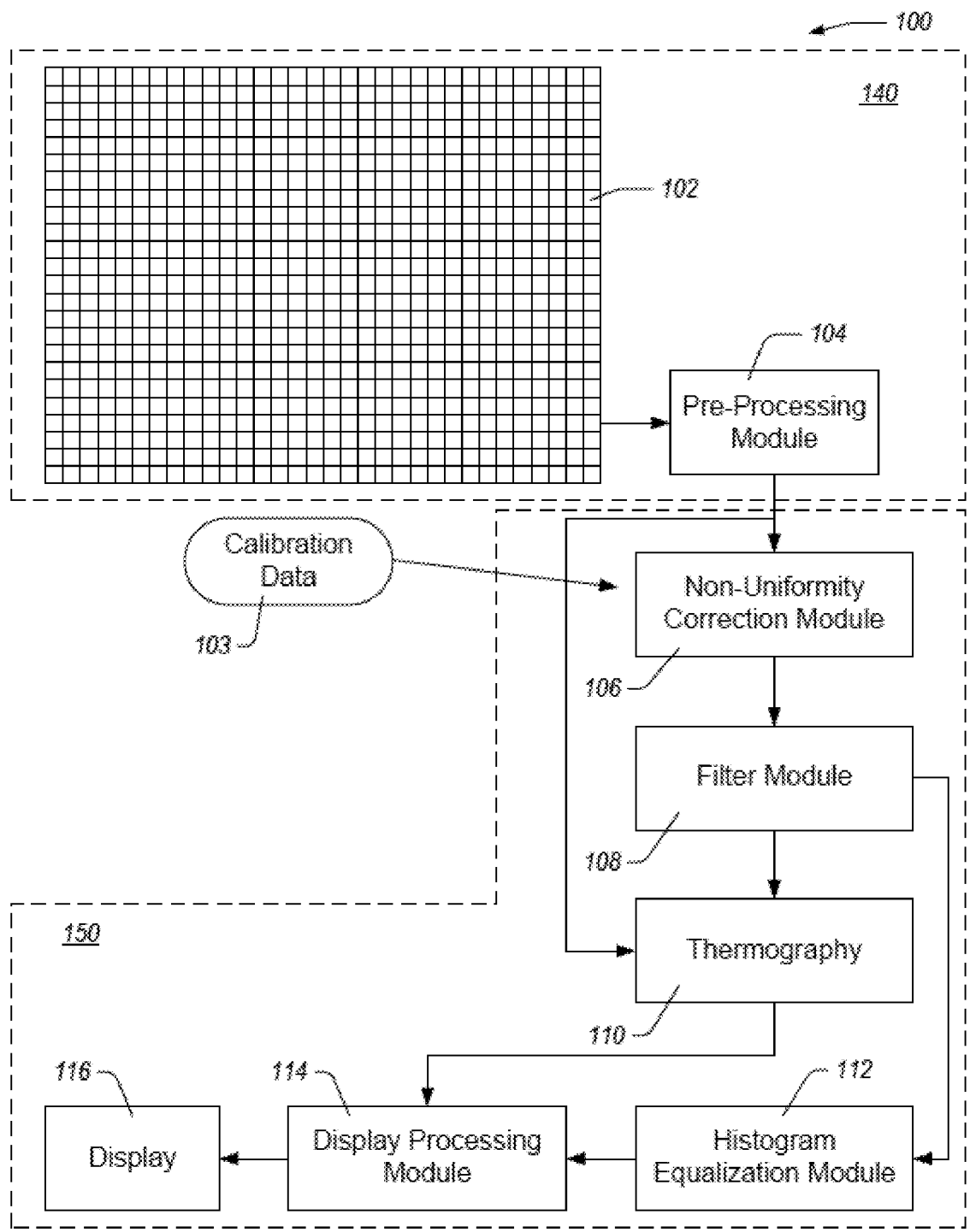
FIG. 1B illustrates a functional block diagram of the example imaging system illustrated in FIG. 1A, wherein functionality of the imaging system is divided between a camera and a mobile electronic device.

The imaging system 100 can be provided as a standalone device, see, e.g., FIG. 1B, such as a thermal sensor. For example, the imaging system 100 can include an imaging system housing configured to enclose hardware components (e.g., the focal plane array 102 with read out electronics, and a processor for signal processing and display, which may include microprocessors, data storage, field programmable gate arrays and other electronic components, and the like) of the imaging system 100. The imaging system housing can be configured to support optics 130 configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like, and a display 116 which may also be part of the user interface such as a touchscreen display.

In some embodiments, the imaging system 100 can be part of a network of a plurality of imaging systems. In such embodiments, the imaging systems can be networked together to one or more controllers.

FIG. 1B illustrates a functional block diagram of the example imaging system 100 illustrated in FIG. 1A, wherein functionality of the imaging system 100 is divided between a camera or sensor 140 and a processing device 150. Processing device 150 may be a mobile device or other computing device. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the processing device 150 can be included in the camera 140 instead of in the processing device 150. In some embodiments, certain advantages are realized based at least in part on the division of functions between the camera 140 and the processing device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the processing device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the processing device 150 (e.g., in the thermography module 110).

An output of the camera 140 can be a stream of digital data representing pixel values provided by the pre-processing module 104. The data can be transmitted to the processing device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The processing device 150 can be a smartphone, tablet, laptop, computer, or other similar portable or non-portable electronic device. In some embodiments, power is delivered to the camera 140 from the processing device 150 through the electrical connectors and/or cables.

The imaging system 100 can be configured to leverage the computing power, data storage, and/or battery power of the processing device 150 to provide image processing capabilities, power, image storage, and the like for the camera 140. By off-loading these functions from the camera 140 to the processing device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the processing device 150 to perform image processing, data storage, and the like.

Figure 2:
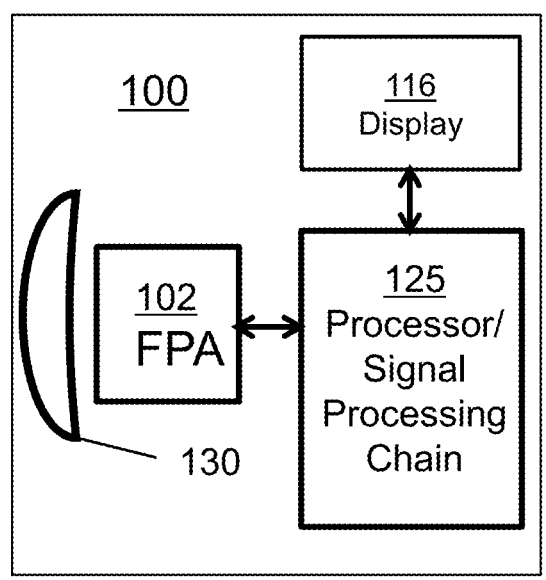
FIG. 2 illustrates a simplified schematic of an example thermal imaging system.

Accordingly, as shown in FIG. 2, the imaging system 100 may generally include optics 130, an imaging sensor such as a focal plane array 102, a signal processing chain 125, and a display 116. It will be appreciated that the various elements described elsewhere herein as being part of the signal processing chain may be logic elements, such as software, firmware, or other routines executing on one or more hardware logic devices anywhere within the imaging system 100. For example, such components may be executed at the focal plane array 102, a processing core in communication with the focal plane array 102, a smartphone, tablet, or other personal electronic device directly or indirectly in communication with the focal plane array 102 and/or processing core of a thermal imaging device. Any component of the signal processing chain 125 may be executed on a single hardware component and/or may be distributed across a plurality of hardware components within a single device or across a plurality of devices (e.g., a personal electronic device, camera, or other device). Moreover, any combination or sub-combination of signal processing chain 125 components described herein may be executed on a single hardware logic device.

Concepts of Color Display

The present disclosure relates primarily to a thermal imaging system, which along with providing a thermal image of a scene also may be capable of providing a temperature for all or parts of the scene. In general, when a thermal image is displayed, the color levels in the image correspond to the intensity measured by the array of photodetectors. How color levels for display are determined is described in depth in the above incorporated references Ser. Nos. 14/292,124 and 14/851,576. In these references it is described that the intensity signals are usually presented to the image processing chain as a digital word, the size of which is the ADC conversion size. For example, a 14 bit ADC provides intensity values ranging from 0 to 16383 in steps of 1. Thus there are 16384 possible intensity values, for a 14 bit ADC, corresponding to 16384 different scene temperatures. As described in the incorporated references, typically this data has to be displayed using a color table that usually has far fewer discrete values, such as 0 to 255 (8 bits) which is the typical color table size. Thus for a 14 bit imaging system utilizing an 8 bit display format, clearly not every possible intensity value can be assigned a unique color.

Figure 3:
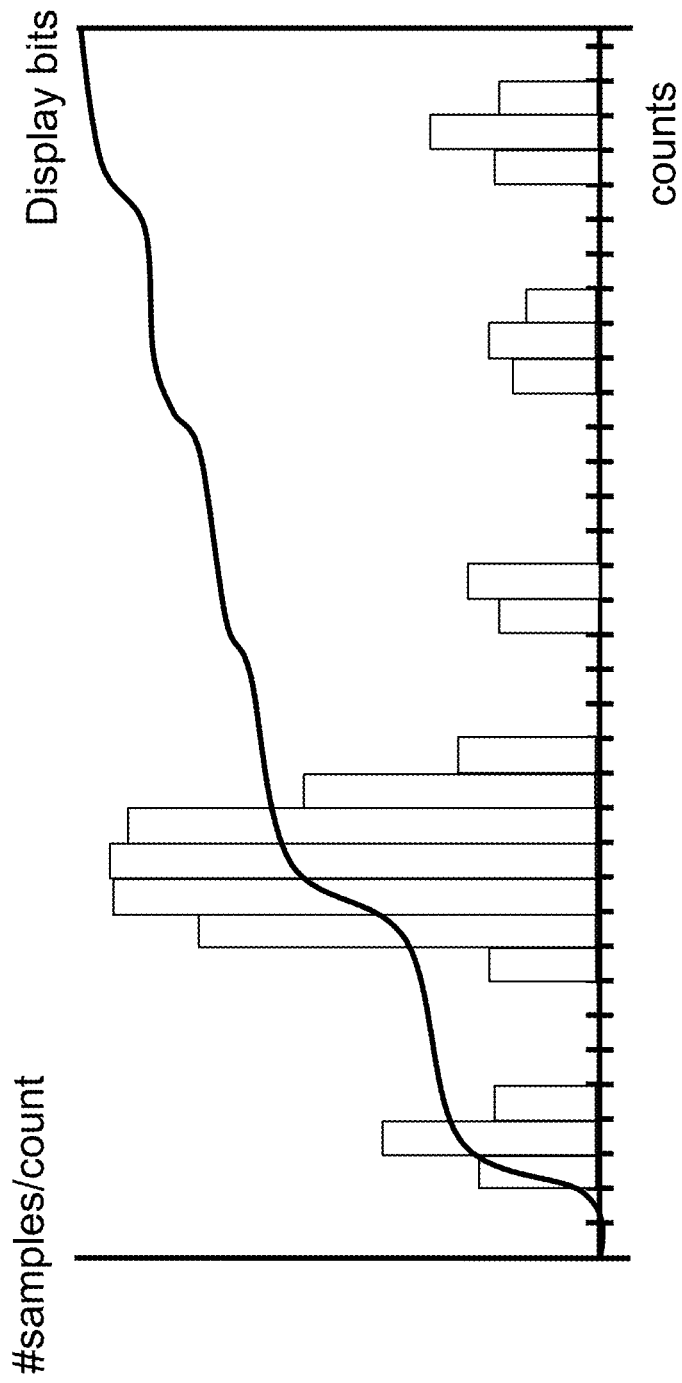
FIG. 3 illustrates an example Histogram Equalization (HE) implementation.

Because there are far more possible intensity values than available colors, it is usually desirable to allocate the colors judiciously. Histogram equalization (HE) processes are frequently used for such allocation of colors. In many thermal scenes, not all image-able temperatures are present, resulting in only some of the intensity values in the ADC range being populated. As shown in FIG. 3, a histogram of samples/count vs. count (the count is the digital word corresponding to a specific intensity, so samples/count is how many pixels of the image have a certain intensity value or temperature), there are only counts centered around five values, corresponding to the presence of five temperature regions in the scene, so for many possible intensity values there is no signal. The HE processes, of which there are many variations, one way or another allocate the color levels (display bits) to the populated intensity values and not to values that aren't present in an image. This results in high visible resolution for the actual temperatures present in a given scene.

However, if the camera is pointed in a different direction, and the imaged scene has different temperature groupings, the HE will re-allocate the color levels appropriately to the new mix of actually present temperatures. Thus the color assigned to a specific intensity value (temperature) can change from scene to scene. HE improves visual temperature resolution, but there is not necessarily a consistent correlation of color to actual scene temperature from scene to scene. In systems with thermography processes, it may be possible to display scene temperature numerically at selected locations in the image, such as the image center or at some user selected point, but the colors in the image in an HE derived image provide little indication of absolute scene temperature, just relative scene temperature. For some applications, this implementation may be less desirable or even potentially dangerous. For example, a firefighter using a thermal camera may need to know which portions of the environment are actually hazardous or have the potential to quickly become hazardous. Having to select locations and read numerical temperatures may not provide adequate information regarding the surroundings in a timely manner. Thus a new way of allocating colors to image intensities may be desirable for some thermal imaging applications.

Example Color Allocation

Figure 4:
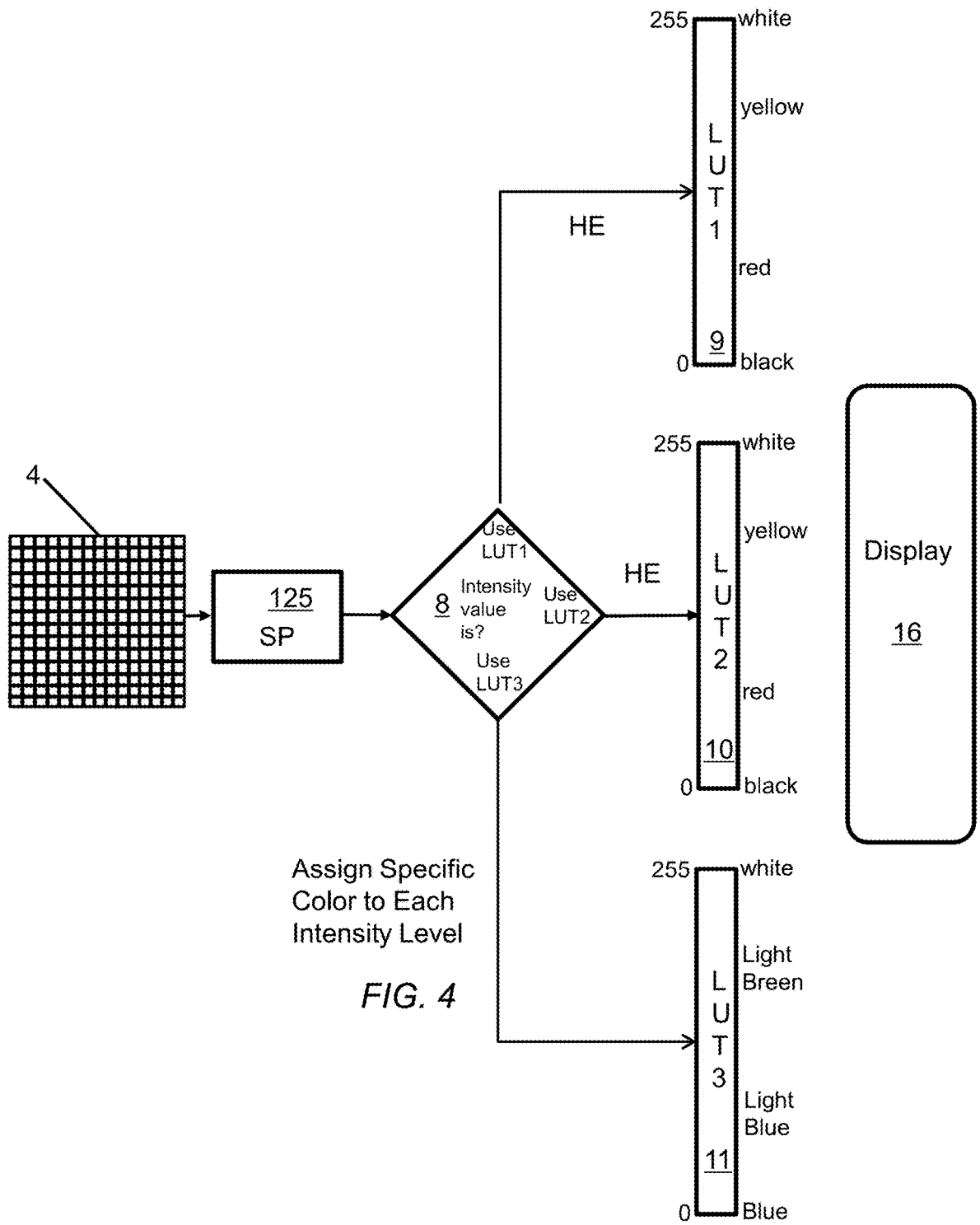
FIG. 4 illustrates an example embodiment of a color display process.

Referring to FIG. 4, the basic elements of a novel color allocation technique are shown. An image frame 4 of digital intensity values corresponds to image data acquired from some or all individual photodetectors (e.g., pixels) in a thermal imaging system. The intensity values may either be raw, e.g., direct from the FPA, or filtered and/or processed by the signal processing chain 125 before being presented for coloring and display. One of the chain elements 8 performs a division of the entire intensity ADC range into two or more sub-ranges, 9, 10, 11 of continuous or non-continuous values. For example, one sub-range for a 14-bit system might include values from 0 to 15359 and another sub-range might include values from 15360 to 16383. There may be as many sub-ranges as desirable. Processing chain element 8 may assign colors from a first color table or set of color tables to one or more of the sub-ranges 9, 10, 11 using an HE process to maximize visual temperature resolution. Where a plurality of sub-ranges have colors assigned using HE processes, each HE-assigned sub-range may have colors allocated based on the same color table, or based on different color tables for each sub-range. However, at least one sub-range can be assigned to a unique color table not using an HE technique. At least one sub-range will have a specific color table value assigned to each intensity value in the sub-range. Thus, for the at least one non-HE sub-range, each color of the assigned color table will consistently correspond to a particular scene temperature from scene to scene, regardless of changing scene temperature distributions between different scenes. Thus the colors observed on display 16 will accordingly have different meaning for each color table.

The non-HE range when displayed may not show all colors in its color table for a particular scene, because colors are fixedly allocated to all intensity values in the range, rather than being changed or re-allocated to just the values present in a particular scene. Allocation may be done in any useful fashion, but generally it may be desirable to allocate color levels to intensity levels in a continuous sequential manner, either from minimum to maximum or vice versa but in order. For the usual case where there are more intensity levels than color levels the allocation can for some embodiments be a linear one. For the example case above with two sub-ranges, if the high sub-range (15360 to 16383) is chosen as the non-HE sub-range, there are four times as many intensity levels in the sub-range as available color levels in a 256-count color display range. Thus, a possible assignment would be intensity levels 15360-15363 assigned color level 0 (or 255), intensities 15364-15367 assigned color level 1 (or 254), and so on. Of course it may be desirable to visually accentuate some intensity regions over others and not allocate linearly. It is important to note that depending on the actual implementation of the image processing chain, the actual math may not be performed using direct digital words (e.g., fixed point, floating point, or other numerical systems may be used), but the ratios and concepts are best illustrated with digital word examples.

Figure 5:
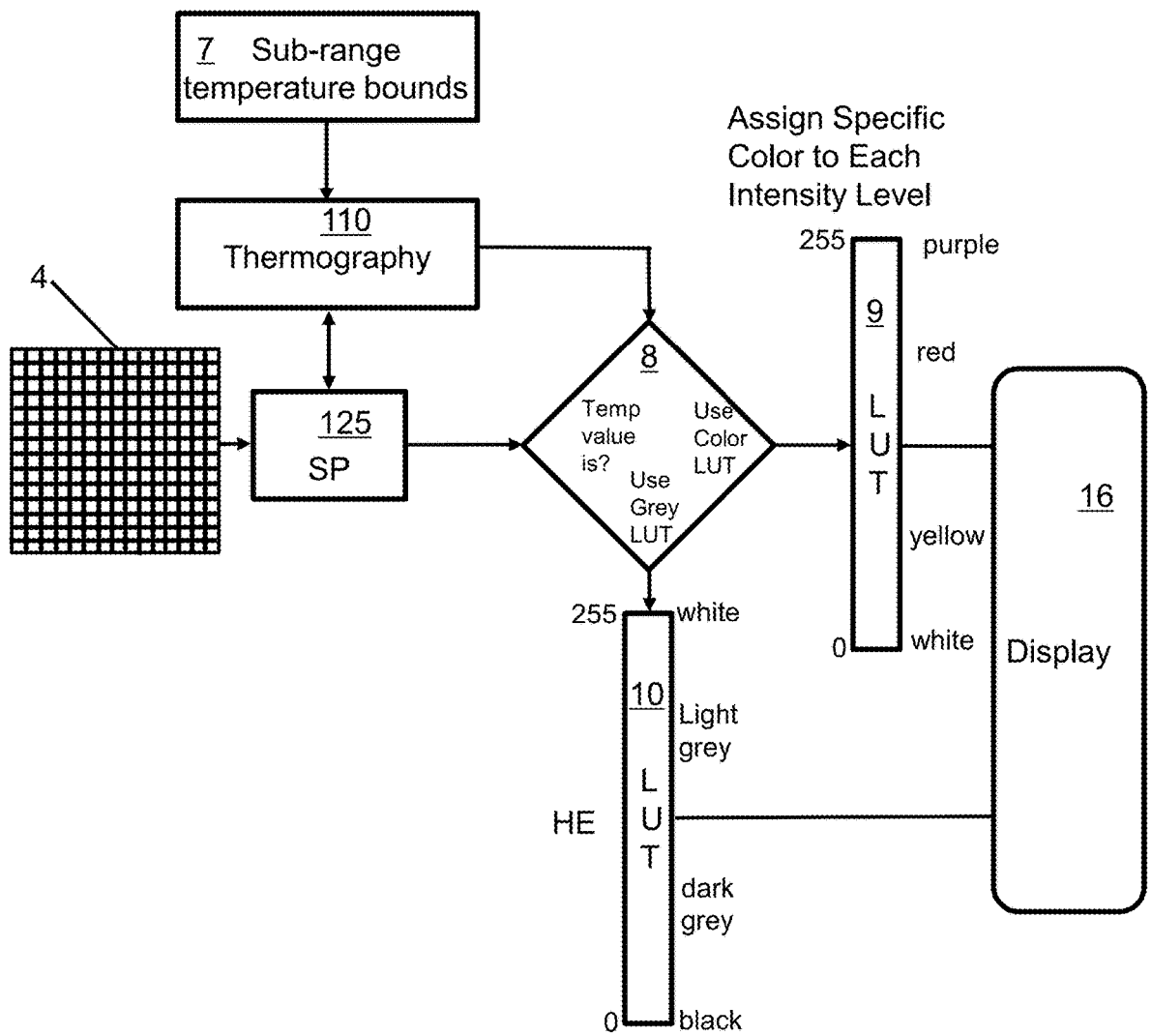
FIG. 5 illustrates an alternative example embodiment of a color display process.
Figure 6:
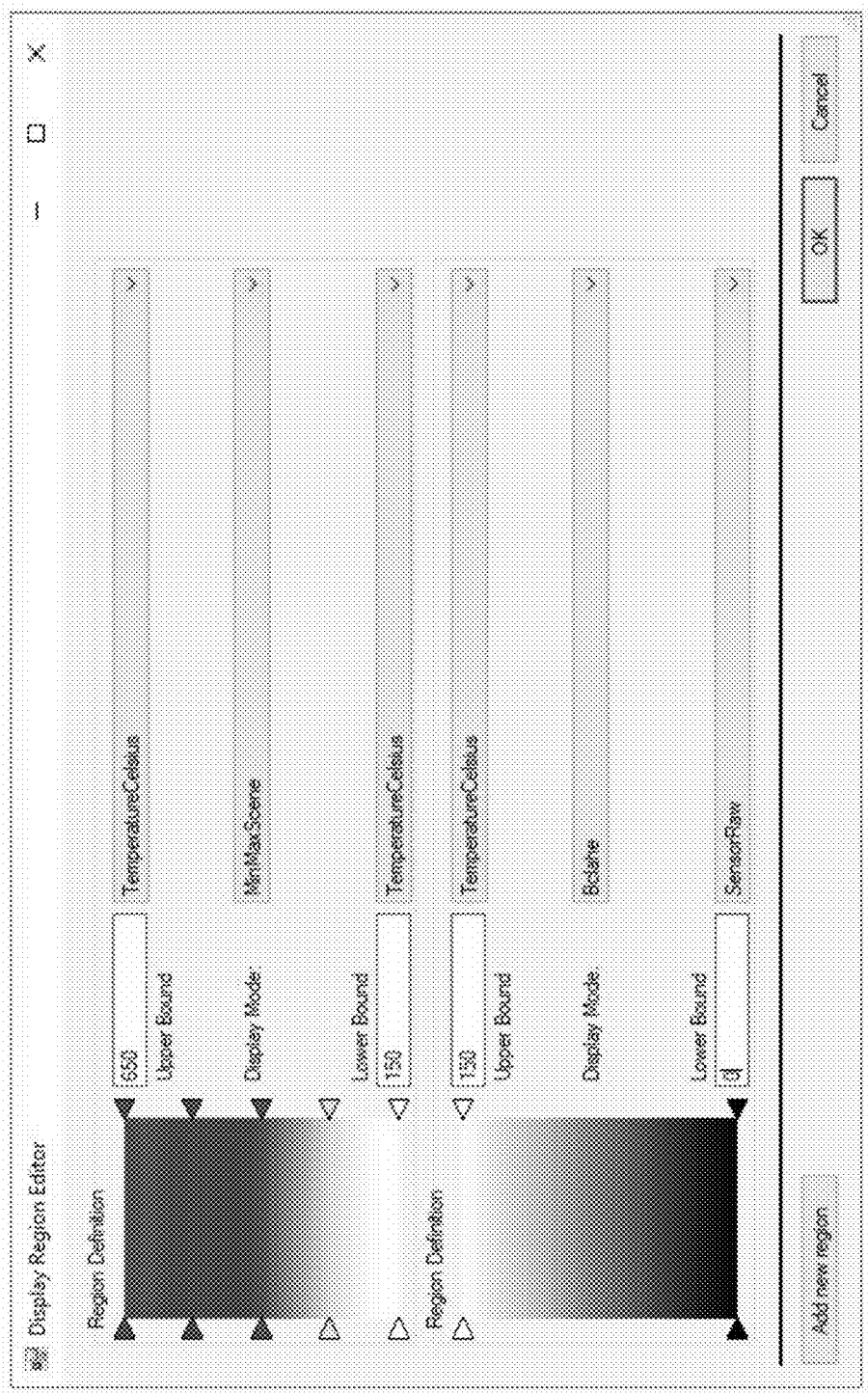
FIG. 6 illustrates an exemplary implementation of sub-range selection in a color display process.

FIG. 5 illustrates a system which includes a thermography element 110. In this system, actual scene temperature is associated with some or all possible intensity values in the whole ADC range for some or all pixels in an image frame. Thus the sub-ranges may be determined by temperature bounds set by element 7 and checked by element 8. In the case shown in the figure, two sub-ranges are utilized, one for HE allocation 10 and one for specific color allocation 9. In this case of the sub-range allocated to color table 9, colors displayed using 9 will directly correlate to individual temperature values of the scene. Thus if high contrast is used between the color tables, as shown in FIG. 5, the HE sub-range is displayed using a greyscale color table, while the specific color sub-range is displayed using a bright red-yellow color table. Accordingly, the colors directly associated with temperature will be easy to observe and interpret. FIG. 6 illustrates a thermography implementation of a color allocation scheme particularly aimed at thermal imaging for firefighting using two sub-ranges as in FIG. 5. One sub-range is defined as covering the range from 0 to 150 degrees C. This sub-range is assigned to a color table with an HE process (BCLAHE is one particular HE variation). The lower sub-range represents a temperature range a firefighter in a fire suit can tolerate, and therefore visual resolution is important, for example, to see objects in the dark, so HE is preferable. A different color table, chosen to be high contrast to the HE table is used for the sub-range covering temperatures 150 to 650 degrees C. 650 degrees or higher may indicate extreme combustion or backdraft danger, so quickly determining temperatures in the dangerous range by color may be more useful than high visual temperature resolution (e.g., as would be achieved by HE processes).

Thus, a useful sub-range allocation may include the low temperature sub-range being displayed in a muted color table with HE, while a higher temperature sub-range is displayed in a bright color table with fixed color allocation. Reversing this for highlighting cold temperatures may also be useful. However, many other variations are possible and may be useful for certain applications. For example, in some implementations it may be desirable to select a mid-temperature sub-range for specific color assignment, and bracket it with two lower and higher sub-ranges using HE color allocation. In this case the higher and lower sub-ranges may split a single color table and/or may use two color tables that match up at either end. For this case, much of the image would benefit from HE visual resolution, while an intermediate band of temperatures correspond to fixed colors. Sub-ranges may be non-continuous as well, and variations where the entire range or an overlapping range is processed using HE, while a sub-range is specifically colored and overlaid (e.g., blended) would also be possible. This case may be useful for scenes with a lot of features of similar temperature and no large outliers. Many variations are possible and fall within the scope of the disclosed techniques.

Example Color Display Process Steps

Figure 7:
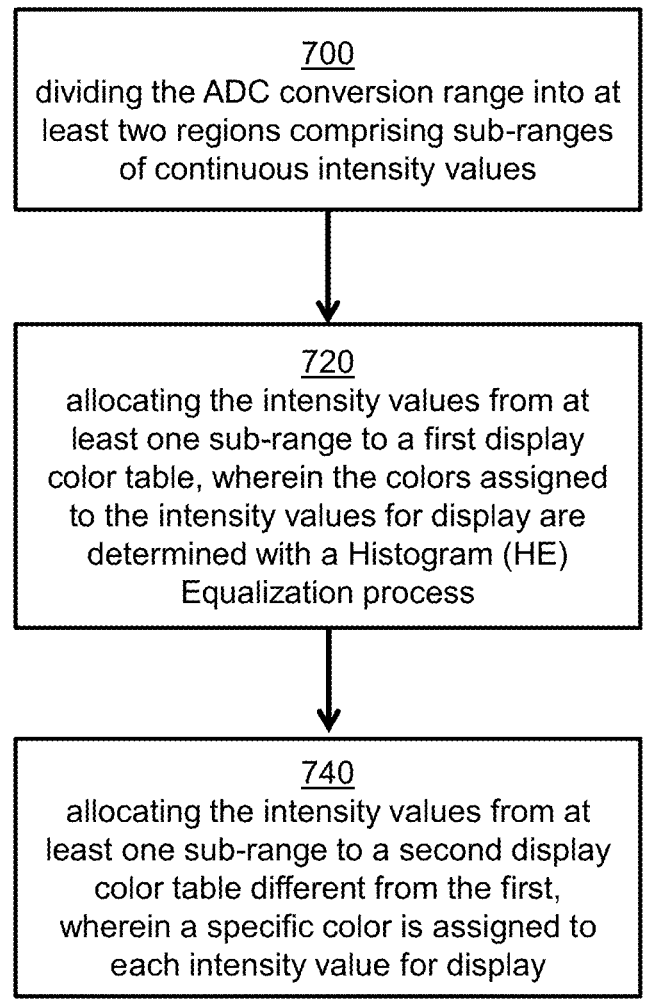
FIG. 7 is a flow chart depicting an example color display process.

FIG. 7 is a flow chart illustrating an example process for color display. For ease of description, the process will be described as being performed by the imaging system 100 described herein with reference to FIGS. 1A and 1B as well as FIG. 2. However, one or more of the steps of the process can be performed by any module or combination of modules in the imaging system 100. Similarly, any individual step can be performed by a combination of modules not shown in the imaging system 100.

At block 700, the ADC conversion range is divided into two or more sub-ranges of intensity values. In most embodiments the sub-ranges may be continuous, but non-continuous sub-ranges may also be used.

At block 720, the intensity values from at least one sub-range are allocated to a first color table for display using an HE process. In some embodiments, more than one sub-range may be allocated using HE to a split or continuous color table. It is also possible to allocate the entire range using HE. For example, the HE sub-range may include the entire range of ADC conversion values.

At block 740, the intensity values from at least one sub-range are allocated to a color table different from the first table, with a fixed allocation in which a specific color table value is assigned to each intensity value in the sub-range. As described elsewhere herein, individual color table values may be allocated to unique intensity values in the fixed-allocation sub-range, and/or may be allocated to a plurality of intensity values (e.g., where there are more possible intensity values in the sub-range than color values in the color table). In some embodiments, such as where a non-linear allocation scale is used, certain color table values may be allocated to different numbers of intensity values. In some embodiments, HE allocation may then be performed over the entire range, and specifically assigned colors may be overlaid (e.g., blended) over the HE allocated display.

For some applications, rather than having certain temperatures fixed to color values, dividing an image into two or more sub-ranges with different colorizations may be useful to highlight objects of interest. For example, in search and rescue or hunting applications it may be useful to increase the contrast of certain temperatures, such as around body temperature, to make objects containing certain temperatures vividly stand out in displayed thermal images.

Figure 8:
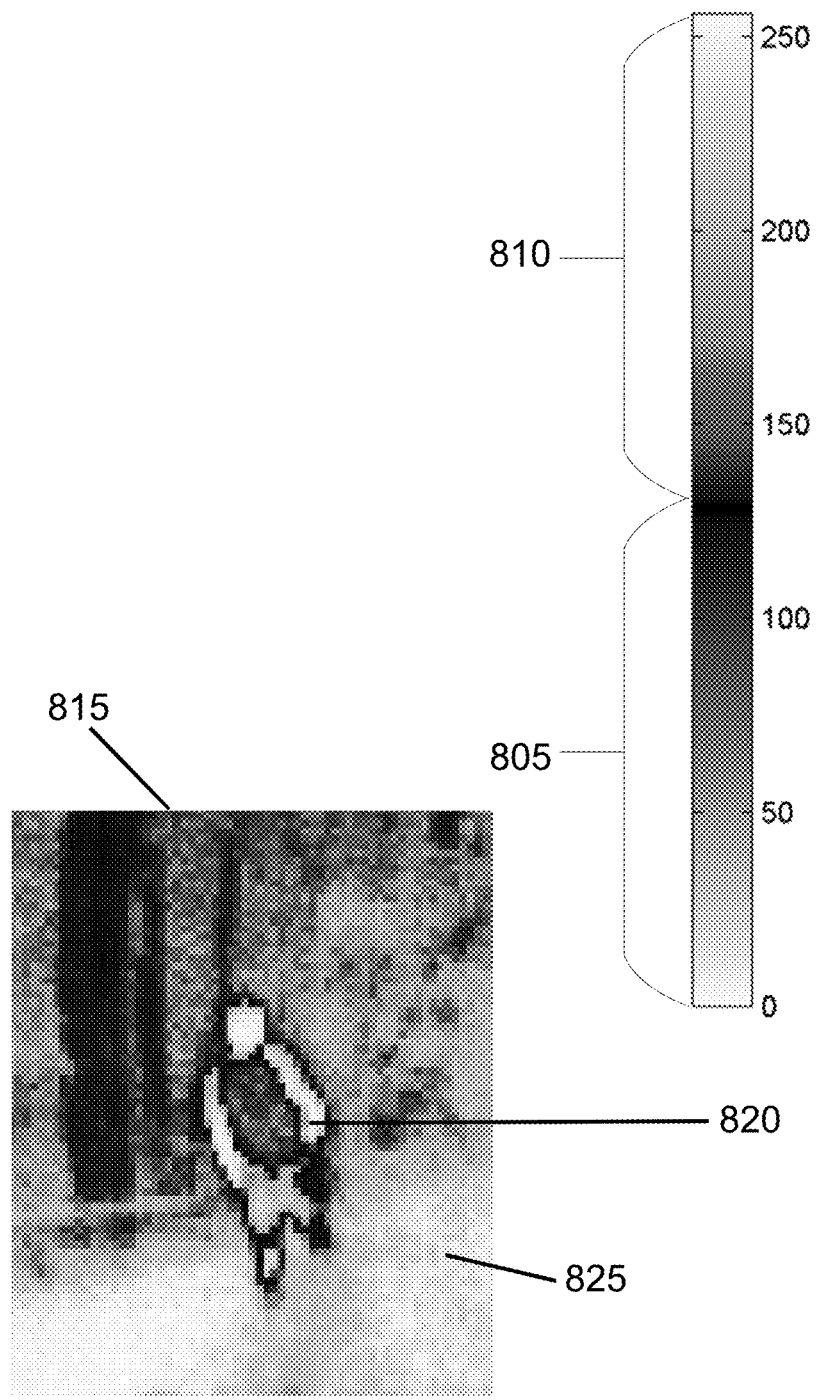
FIG. 8 depicts an example sub-range allocation in a color display process.
Figure 9:
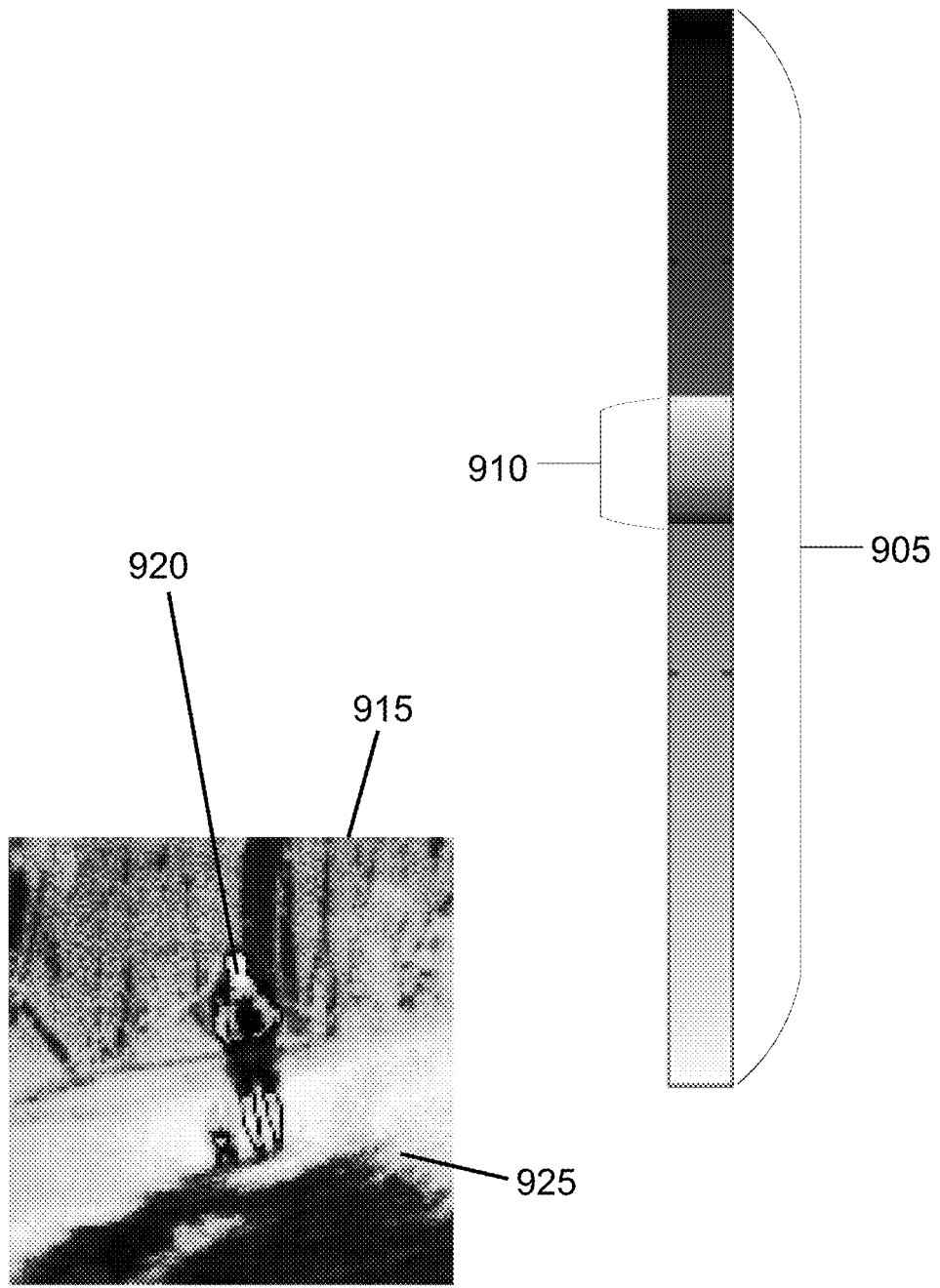
FIG. 9 depicts an example sub-range allocation in a color display process.

FIGS. 8 and 9 illustrate this concept. All or part, and for many cases the full image range, may be designated a first thermal intensity range of an image and may be colorized with a first color table. In the case of FIG. 8, the first range 805 includes approximately half of the full 256-count display range (e.g., 128 values), and in FIG. 9 the first range 905 includes the full 256-count display range. The first color table may be of any desired type. In some embodiments, a suitable first color table may be a variation of greyscale. In the embodiments depicted in FIGS. 8 and 9, the first color table is a "black hot" color table.

A second sub-range is defined as a target range. In FIG. 8, the target range 810 includes approximately the upper half of the whole range, while in FIG. 9, the target range 910 includes an intermediate segment of intensity values within the full range. For systems with thermography arrangements, the upper and lower limits of the target sub-ranges 810, 910 may correspond to scene temperatures.

The target range may be established by user selection of upper and lower limits. Alternatively, certain operating modes, such as search and rescue modes or the like, may utilize preselected or automatically established target ranges aimed at specific temperature ranges of interest, such as body temperature. If there are no pixels, or only a small number of pixels, in an image that fall within the target range, it may be desirable to not colorize the target range differently from the rest of the image. In such image frames, the system may allocate display colors without using the target range color table 810, 910. For example, in the example of FIG. 9, the entire image frame may be displayed based on the greyscale color table for the first sub-range 905. However, if the number of pixels in the target range exceed a user selected and/or predetermined number, it may be advantageous to colorize some or all of the target range pixels with a second color table to produce contrast for target range image elements.

In particular, to provide even more contrast, only some of the target range pixels may be selected for colorization with a second color table, providing even more target range contrast. The second color table may be allocated to the chosen pixels either all or in part by any of a variety of procedures, including, linear allocation, Histogram Equalization (HE), fixed color allocation, or others.

With continued reference to FIGS. 8 and 9, particular examples will now be described. In FIG. 8, a first sub-range 805, including approximately the lower half of 256-count values, is allocated with a black hot color table (or Look Up Table (LUT)). A target range 810, including approximately the upper half of 256-count values, is then allocated with a colorized color table or LUT. For example, the upper target range may correspond to values including typical human or animal body temperatures. Accordingly, when an example image frame 815 is displayed, one or more target regions 820 corresponding to a human body have values in the target range 810, and appear colorized, enhancing the perceived contrast between the target regions 820 and the background regions, which have values below the target range 810 and are accordingly rendered in greyscale based on the LUT for the first sub-range 805. Alternatively, in some embodiments the target range may also be allocated with a greyscale color table (e.g., the first sub-range 805 may use a black hot color table, and the target sub-range may use a white hot color table). In the example of FIG. 8, which may be performed using a floating point temperature image, the full image may first be colorized using the lower black hot table with HE. The system may then identify "target" pixels that have values within the target range 810. If less than a predetermined number or percentage of pixels are identified as being target pixels, the process may terminate and the entire image may be displayed using the black hot color table. If more than the predetermined number or percentage of pixels are target pixels, the target pixels may then be allocated into the values of the target range 810 (e.g., by binning within values 128-256), such that the target is vividly colorized relative to the background as shown in the example image frame 815.

Turning to FIG. 9, a first sub-range 905 including the full range is HE allocated with a first black hot color table or LUT, in this case the full 256-level LUT. A middle target range 910 is established and is allocated all or part of a second LUT, in this case all 256 levels of a blue to yellow LUT, which is very high contrast to the black hot first color table. If less than a predetermined number or percentage (e.g., X %) of all pixels fall within the target range, then a second LUT colorization may be omitted. If more than the predetermined number or percentage of all pixels do fall within the target range, then the top (e.g., highest intensity) Y % (e.g., a predetermined percentage) of the target pixels are colorized, in this case using HE (although fixed colorization may equally be used for the target range 910), and displayed in the image 915 in place or mixed with the first color table (LUT) pixels. For the example image frame 915 shown in FIG. 9 and the example image frame 815 shown in FIG. 8, X is 10 and Y is 1, which means for a QVGA image having 76800 pixels, 1% of 10% of 76800, or around 100 pixels, are colorized with an entire second LUT selected to be high contrast to the first black hot LUT. With the target range chosen to be around body temperature, for the example of FIGS. 8 and 9, the result is very vivid colorization of parts of the image that fall within the target range (e.g., contrasting target region 920 from surroundings 925). The application to search and rescue is clear, as such techniques may allow living things such as people or animals to be visually identified and distinguished from their surroundings, which may have substantially cooler temperatures (e.g., trees, snow, etc.).

Many variations to the examples of the figures are possible. In some embodiments, more than two sub-ranges may be selected and more than one LUT per sub-range is possible. In addition, any combination of LUT allocations may be used, ranging from a few colors to the whole color table for either the first or target sub-range. Limits may be set using thermography-derived temperature values or raw and/or processed image intensity values. In particular, the target ranges and pixel selection percentages may be varied under user control or pre-programmed as certain operating modes aimed at specific applications such as search and rescue.

Depending on the embodiment, certain acts, events, or functions of any of the processes described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for displaying data from a thermal imaging system, the thermal imaging system including an array of photodetectors, each detector configured to output a signal corresponding to an acquired thermal intensity of a portion of an imaged scene, the signal comprising a binary word whose value is an analog-to-digital conversion (ADC) of the intensity, and wherein the binary word is within a conversion range of the system, the method comprising:
    dividing the conversion range into at least two regions comprising sub-ranges of continuous or non-continuous intensity values, wherein the intensity values comprise at least one of raw intensity values and filtered intensity values;
    allocating the intensity values of at least a first sub-range to a first display color table, wherein the colors assigned to the intensity values of the first sub-range for display are determined with a histogram equalization (HE) process; and
    allocating the intensity values of at least a second sub-range to a second display color table different from the first display color table, wherein the colors assigned to the intensity values of the second sub-range for display are determined with a fixed allocation in which a specific color table value is assigned to each intensity value for display.

2. The method of claim 1, wherein an available number of binary word values corresponding to the ADC range is larger than a number of discrete color values corresponding to the color tables.

3. The method of claim 1, wherein the first sub-range corresponds to a range of intensity values lower than the intensity values of the second sub-range.

4. The method of claim 1, wherein intensity values from minimum to maximum in the second sub-range are assigned specific sequential values from the second color display table.

5. The method of claim 4, wherein the assignment of specific sequential values is performed linearly between color table values and intensity values, wherein specific colors represent fixed intensity levels.

6. The method of claim 1, wherein the imaging system includes a thermography function that converts intensity values to scene temperature.

7. The method of claim 6, wherein the sub-ranges are identified as covering temperature ranges.

8. The method of claim 6, wherein each color specifically allocated to sub-range intensity values corresponds to a specific temperature.

9. The method of claim 8, wherein the first sub-range is selected to be below at least one temperature of interest, and wherein the second sub-range is selected to be above at least one temperature of interest.

10. The method of claim 9, wherein the second sub-range is chosen to be at least 150 degrees C., and wherein the top of the second sub-range is at least 650 degrees C.

11. A thermal imaging system, the thermal imaging system comprising an array of photodetectors, each photodetector configured to output a signal corresponding to an acquired thermal intensity of a portion of an imaged scene, the signal comprising a binary word whose value is an analog-to-digital conversion (ADC) of the intensity and wherein the binary word is within a conversion range of the system, the thermal imaging system further comprising at least one processor for acquiring and processing image data from the photodetector array, and a display for image data, the thermal imaging system configured to:
    divide the conversion range into at least two regions comprising sub-ranges of continuous or non-continuous intensity values, wherein the intensity values comprise at least one of raw intensity values and filtered intensity values;
    allocate the intensity values of at least a first sub-range to a first display color table, wherein the colors assigned to the intensity values of the first sub-range for display are determined with a histogram equalization (HE) process; and
    allocate the intensity values of at least a second sub-range to a second display color table different from the first color display table, wherein the colors assigned to the intensity values of the second sub-range for display are determined with a fixed allocation in which a specific color table value is assigned to each intensity value for display.

12. The system of claim 11, wherein an available number of binary word values corresponding to the ADC range is larger than a number of discrete color values corresponding to the color tables.

13. The system of claim 11, wherein the first sub-range corresponds to a range of intensity values lower than the intensity values of the second sub-range.

14. The system of claim 11, wherein intensity values from minimum to maximum in the second sub-range are assigned specific sequential values from the second color display table.

15. The system of claim 14, wherein the assignment of specific sequential values is performed linearly between color table values and intensity values, wherein specific colors represent fixed intensity levels.

16. The system of claim 11, wherein the imaging system includes a thermography function that converts intensity values to scene temperature.

17. The system of claim 16, wherein the sub-ranges are identified as covering temperature ranges.

18. The system of claim 16, wherein each color specifically allocated to sub-range intensity values corresponds to a specific temperature.

19. The system of claim 18, wherein the first sub-range is selected to be below at least one temperature of interest, and wherein the second sub-range is selected to be above at least one temperature of interest.

20. The system of claim 19, wherein the second sub-range is chosen to be at least 150 degrees C., and wherein the top of the second sub-range is at least 650 degrees C.

* * * * *